(12) United States Patent
Liao

(10) Patent No.: US 7,499,137 B2
(45) Date of Patent: Mar. 3, 2009

(54) OPTICALLY COMPENSATED BIREFRINGENCE LIQUID CRYSTAL DISPLAY PANEL

(75) Inventor: Chi-Nan Liao, Taoyuan (TW)

(73) Assignee: Au Optronics Corp., Hsinchu (TW)

( * ) Notice: Subject to any disclaimer, the term of this patent is extended or adjusted under 35 U.S.C. 154(b) by 426 days.

(21) Appl. No.: 11/465,327

(22) Filed: Aug. 17, 2006

(65) Prior Publication Data

US 2007/0188679 A1    Aug. 16, 2007

(30) Foreign Application Priority Data

Feb. 13, 2006    (TW) .............................. 95104694 A

(51) Int. Cl.
*G02F 1/1343* (2006.01)
(52) U.S. Cl. .............................. 349/139; 349/33; 349/34
(58) Field of Classification Search .................. 349/33, 349/34, 139
See application file for complete search history.

(56) References Cited

U.S. PATENT DOCUMENTS 6,873,377 B2    3/2005    Konno et al.

2003/0048401 A1    3/2003    Hanaoka et al.

FOREIGN PATENT DOCUMENTS

| JP | 2002-296596 | 10/2002 |
|----|-------------|---------|
| KR | 2003-0022749 | 3/2003 |

*Primary Examiner*—Richard H Kim
(74) *Attorney, Agent, or Firm*—J.C. Patents

(57) ABSTRACT

An optically compensated birefringence liquid crystal display (LCD) panel is provided, which includes an active device array apparatus, a color filter apparatus, and an optically compensated birefringence liquid crystal layer disposed between the active device array apparatus and the color filter apparatus. The color filter apparatus includes a substrate, a color filter array, a common electrode, a plurality of electrode lines, and an insulating layer. The color filter array is disposed on the substrate and has a black matrix and a color filter layer. The common electrode is disposed over the color filter array. The electrode lines are disposed over the common electrode. The insulating layer is disposed between the common electrode and the electrode lines. Accordingly, the problems of delay of data signal and overload of the driving circuit when a high voltage is applied to the control signal electrode of the conventional LCD panel are resolved.

27 Claims, 9 Drawing Sheets

OPTICALLY COMPENSATED BIREFRINGENCE LIQUID CRYSTAL DISPLAY PANEL

CROSS-REFERENCE TO RELATED APPLICATION

This application claims the priority benefit of Taiwan application Ser. No. 95104694, filed on Feb. 13, 2006. All disclosure of the Taiwan application is incorporated herein by reference.

BACKGROUND OF THE INVENTION

1. Field of Invention

The present invention relates to a liquid crystal display (LCD) panel. More particularly, the present invention relates to an optically compensated birefringence LCD panel having short response time.

2. Description of Related Art

Liquid crystal displays are divided into many categories based on the type of liquid crystal used, the driving method, and the location of light source disposition. Wherein, optically compensated birefringence liquid crystal display (OCB LCD) has very quick response speed and can provide more smooth display quality while playing fast-switching continuous images such as animations, so it is very suitable to be applied to high-scale LCD. However, the optically compensated birefringence LCD can only enter standby status to provide quick response performance after all the liquid crystal molecules are switched from splay state to bend state.

FIG. 1A is a diagram illustrating liquid crystal molecules in splay state in a LCD panel. FIG. 1B is a diagram illustrating liquid crystal molecules in bend state in a LCD panel. Referring to both FIG. 1A and FIG. 1B, in the optically compensated birefringence LCD panel 10, the liquid crystal layer 11 is disposed between the top substrate 12 and the bottom substrate 13. The top substrate 12 and the bottom substrate 13 respectively have an alignment layer (not shown) parallel to each other in the rubbing direction. The liquid crystal molecules in the liquid crystal layer 11 are arranged in splay state while they are not affected by external electric field. While the optically compensated birefringence LCD is entering standby status, an electric filed vertical to the top substrate 12 has to be applied to the liquid crystal molecules to change all the liquid crystal molecules to bend state. In the conventional optically compensated birefringence LCD, a few minutes are needed for the transition procedure to be processed if the pixels are to be driven properly, that is, long time warm up is needed before entering standby status. However, this is very disadvantageous to the "instant on" characteristic of LCD. Thus, to make the optically compensated birefringence LCD more acceptable to consumers, fast transition is necessary.

In order to have the liquid crystal molecules in the optically compensated birefringence LCD transit from splay state to bend state quickly, in a conventional technology, intense electric field is produced by applying high voltage.

FIG. 1C is a cross-sectional view of a conventional optically compensated birefringence LCD panel, and FIG. 1D is a top view of an active device array apparatus in the optically compensated birefringence LCD panel in FIG. 1C, wherein FIG. 1C is a cross-sectional view of FIG. 1D cut along line A-A'. Referring to both FIG. 1C and FIG. 1D, the optically compensated birefringence LCD panel 100 includes a thin film transistor (TFT) array apparatus 110, a color filter apparatus 120, and a liquid crystal layer 130 disposed between the TFT array apparatus 110 and the color filter apparatus 120.

The TFT array apparatus 110 includes a bottom substrate 111, a plurality of scan lines 112, a plurality of data lines 113, a plurality of thin film transistors 114, a plurality of transmissive conductive electrodes 115 (such as Indium Tin Oxide—ITO), a plurality of control signal electrodes 116, and an alignment layer 117. The scan lines 112 and the control signal electrodes 116 are all disposed on the bottom substrate 111. The data lines 113 are disposed over the control signal electrodes 116 (in other conventional technology, the control signal electrodes 116 can also be disposed over the data lines 113). The thin film transistors 114 are electrically connected to the scan lines 112 and the data lines 113 respectively. The transmissive conductive electrodes 115 are electrically connected to the thin film transistors 114 respectively. The alignment layer 117 covers the transmissive conductive electrodes 115.

The color filter apparatus 120 includes a top substrate 121, a black matrix 122, a color filter layer 123, an insulating layer 124, a common electrode 125, and an alignment layer 126. The black matrix 122 and the color filter layer 123 are both disposed on the top substrate 121. The insulating layer 124 covers the black matrix 122 and the color filter layer 123. The common electrode 125 is disposed on the insulating layer 124. The alignment layer 126 is disposed on the common electrode 125.

A high voltage is supplied to the control signal electrodes 116 before the optically compensated birefringence LCD panel 100 displays an image, so that some liquid crystal molecules close to the data lines 113 in the liquid crystal layer 130 over the control signal electrodes 116 transit from splay state to bend state. While scan signals and data signals are respectively supplied to the scan lines 112 and the data lines 113 to display image on the optically compensated birefringence LCD panel, the rest liquid crystal molecules in splay state will transit to bend state under the affection of the liquid crystal molecules which have transited to bend state. In other words, the optically compensated birefringence LCD panel 100 will represent quick response speed.

However, since the data lines 113 are close to the control signal electrodes 116 supplied with a high voltage, thus, the data signal transmission in the data lines 113 are affected by load increase, which will further induce the problem of signal delay, and meanwhile, increase the consumption power of the driver IC.

SUMMARY OF THE INVENTION

Accordingly, the present invention is directed to provide an optically compensated birefringence liquid crystal display (LCD) panel, which can speed up the transition of the optically compensated birefringence LCD panel from splay state to bend state through the electric field formed by the scan lines or the data lines with the electrode lines.

According to another aspect of the present invention, an optically compensated birefringence LCD panel is provided, which can resolve the problem of delay of data signal when a high voltage is supplied to the control signal electrode of the conventional LCD panel.

According to yet another aspect of the present invention, an optically compensated birefringence LCD panel is provided, which can resolve the problem of high power consumption of the driver IC of the conventional LCD panel.

To achieve the aforementioned and other objectives, the present invention provides an optically compensated birefringence LCD panel, which includes an active device array apparatus, a color filter apparatus, and an optically compensated birefringence liquid crystal layer disposed between the active device array apparatus and the color filter apparatus. The active device array apparatus includes a substrate, a plurality of scan lines, a plurality of data lines, and a plurality of pixel units; the scan lines, the data lines, and the pixel units are all disposed on the substrate. The color filter apparatus includes a substrate, a color filer array, a common electrode, a plurality of electrode lines, and an insulating layer. The color filter array is disposed on the substrate, and the color filter array has a black matrix and a color filter layer. The common electrode is disposed over the color filter array. The electrode lines are disposed over the common electrode. The insulating layer is disposed between the common electrode and the electrode lines so that the electrode lines are electrically insulated from the common electrode.

According to an embodiment of the present invention, the scan lines and the data lines are disposed correspondingly to the black matrix on the color filter apparatus.

According to an embodiment of the present invention, each pixel unit is electrically connected to one of the scan lines and one of the data lines, and each pixel unit includes an active device and a pixel electrode.

According to an embodiment of the present invention, the active device is electrically connected to the corresponding scan line and data line, while the pixel electrode is electrically connected to the active device.

According to an embodiment of the present invention, the optically compensated birefringence LCD panel further includes a flat layer, and the flat layer is disposed between the color filter array and the common electrode.

According to the optically compensated birefringence LCD panel in an embodiment of the present invention, the electrode lines are disposed over the black matrix.

According to the optically compensated birefringence LCD panel in an embodiment of the present invention, the material of the electrode lines includes metal.

According to the optically compensated birefringence LCD panel in an embodiment of the present invention, the color filter apparatus further includes an alignment layer covering the common electrode and the electrode lines.

According to an embodiment of the present invention, the optically compensated birefringence LCD panel further includes a first voltage signal source and a second voltage signal source; the electrode lines are electrically connected to the first voltage signal source, and the common electrode is electrically connected to the second voltage signal source. The first voltage signal source provides a first voltage, the second voltage signal source provides a second voltage, and the first voltage is greater than the second voltage.

According to the optically compensated birefringence LCD panel in an embodiment of the present invention, the material of the black matrix includes metal or resin.

The present invention further provides an optically compensated birefringence LCD panel, which includes an active device array apparatus, a color filter apparatus, and an optically compensated birefringence liquid crystal layer disposed between the active device array apparatus and the color filter apparatus. The active device array apparatus includes a substrate, a plurality of scan lines, a plurality of data lines, and a plurality of pixel units; the scan lines, the data lines, and the pixel units are all disposed on the substrate. The color filter apparatus includes a substrate, a color filter array, a flat layer, a plurality of electrode patterns, and a plurality of electrode lines. The color filter array is disposed on the substrate, and the color filter array has a black matrix and a color filter layer. The flat layer covers the color filter array. The electrode patterns are disposed on the flat layer, and the electrode patterns are electrically connected to a common voltage. The electrode lines are disposed on the flat layer, and the electrode lines are electrically insulated from the electrode patterns.

According to an embodiment of the present invention, the scan lines and the data lines are disposed correspondingly to the black matrix on the color filter apparatus.

According to an embodiment of the present invention, each pixel unit is electrically connected to one of the scan lines and one of the data lines, and each pixel unit includes an active device and a pixel electrode.

According to an embodiment of the present invention, the active device is electrically connected to the corresponding scan line and data line, while the pixel electrode is electrically connected to the active device.

According to the optically compensated birefringence LCD panel in an embodiment of the present invention, the materials of the electrode patterns and the electrode lines are the same.

According to the optically compensated birefringence LCD panel in an embodiment of the present invention, a space is disposed between the electrode patterns and the electrode lines on the flat layer, so that the electrode lines are electrically insulated from the electrode patterns.

According to the optically compensated birefringence LCD panel in an embodiment of the present invention, the electrode patterns are correspondingly disposed over the color filter layer, and the electrode lines are correspondingly disposed over the black matrix.

According to the optically compensated birefringence LCD panel in an embodiment of the present invention, the color filter apparatus further includes an alignment layer covering the electrode patterns and the electrode lines.

According to an embodiment of the present invention, the optically compensated birefringence LCD panel further includes a first voltage signal source and a second voltage signal source; the electrode lines are electrically connected to the first voltage signal source, and the electrode patterns are electrically connected to the second voltage signal source. The first voltage signal source provides a first voltage, the second voltage signal source provides a common voltage, and the first voltage is greater than the common voltage.

According to the optically compensated birefringence LCD panel in an embodiment of the present invention, the material of the black matrix includes metal or resin.

The present invention further provides an optically compensated birefringence LCD panel, which includes an active device array apparatus, a color filter apparatus, and an optically compensated birefringence liquid crystal layer disposed between the active device array apparatus and the color filter apparatus. The active device array apparatus includes a substrate, a plurality of scan lines, a plurality of data lines, and a plurality of pixel units; the scan lines, the data lines, and the pixel units are all disposed on the substrate. The color filter apparatus includes a substrate, a color filter array, an insulating layer, a flat layer, and a plurality of electrode patterns. The color filter array is disposed on the substrate, and the color filter array includes a black matrix and a color filter layer. The black matrix defines a plurality of pixel regions on the substrate, and the color filter layer is disposed within the pixel regions. The insulating layer covers the surface of the black matrix. The flat layer is disposed on the color filter array and the insulating layer. The electrode patterns are respectively disposed on the flat layer within the pixel regions, and the electrode patterns are electrically connected to a common voltage.

According to an embodiment of the present invention, the scan lines and the data lines are disposed correspondingly to the black matrix on the color filter apparatus.

According to an embodiment of the present invention, each pixel unit is electrically connected to one of the scan lines and one of the data lines, and each pixel unit includes an active device and a pixel electrode.

According to an embodiment of the present invention, the active device is electrically connected to the corresponding scan line and data line, while the pixel electrode is electrically connected to the active device.

According to the optically compensated birefringence LCD panel in an embodiment of the present invention, the material of the black matrix includes a conductive material.

According to an embodiment of the present invention, the optically compensated birefringence LCD panel further includes a first voltage signal source and a second voltage signal source; the black matrix is electrically connected to the first voltage signal source, and the electrode patterns are electrically connected to the second voltage signal source. The first voltage signal source provides a first voltage, the second voltage signal source provides a common voltage, and the first voltage is greater than the common voltage.

According to the optically compensated birefringence LCD panel in an embodiment of the present invention, the electrode patterns are disposed over the color filter layer without covering the black matrix.

According to the optically compensated birefringence LCD panel in an embodiment of the present invention, the color filter apparatus further includes an alignment layer covering the flat layer and the electrode patterns.

In summary, with the disposition of the electrode lines or the disposition of the conductive black matrix, the LCD panel of the present invention not only performs with quick response, but the signal transmission in the scan lines or the data lines will also not be affected while a high voltage is supplied to the electrode lines or the black matrix since the electrode lines or the black matrix is far from the scan lines and the data lines. Accordingly, the LCD panel will not have the problem of signal delay, and the consumption power of the driver IC will not be increased.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
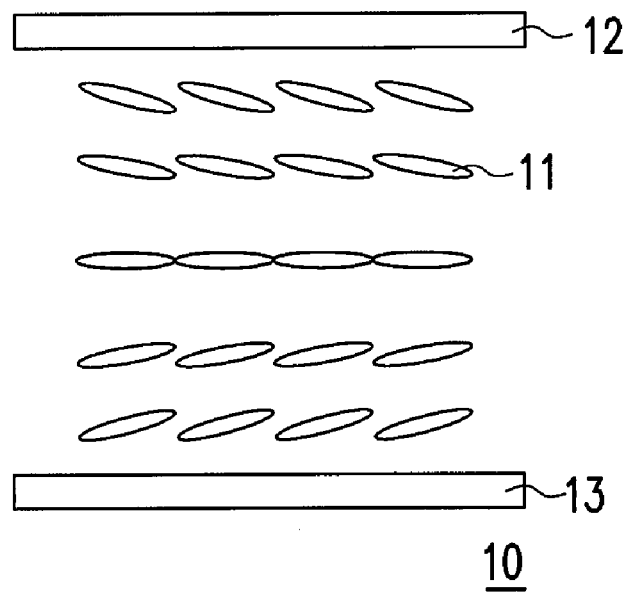
FIG. 1A is a diagram illustrating liquid crystal molecules in splay state in a liquid crystal display (LCD) panel.
Figure 1B:
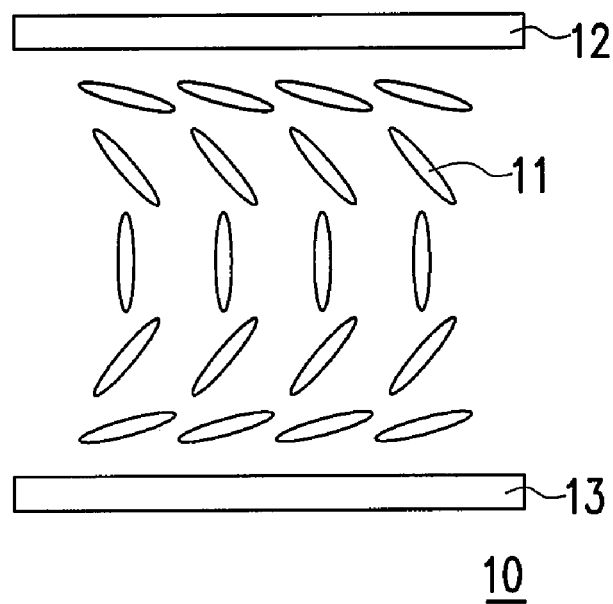
FIG. 1B is a diagram illustrating liquid crystal molecules in bend state in a LCD panel.
Figure 1C:
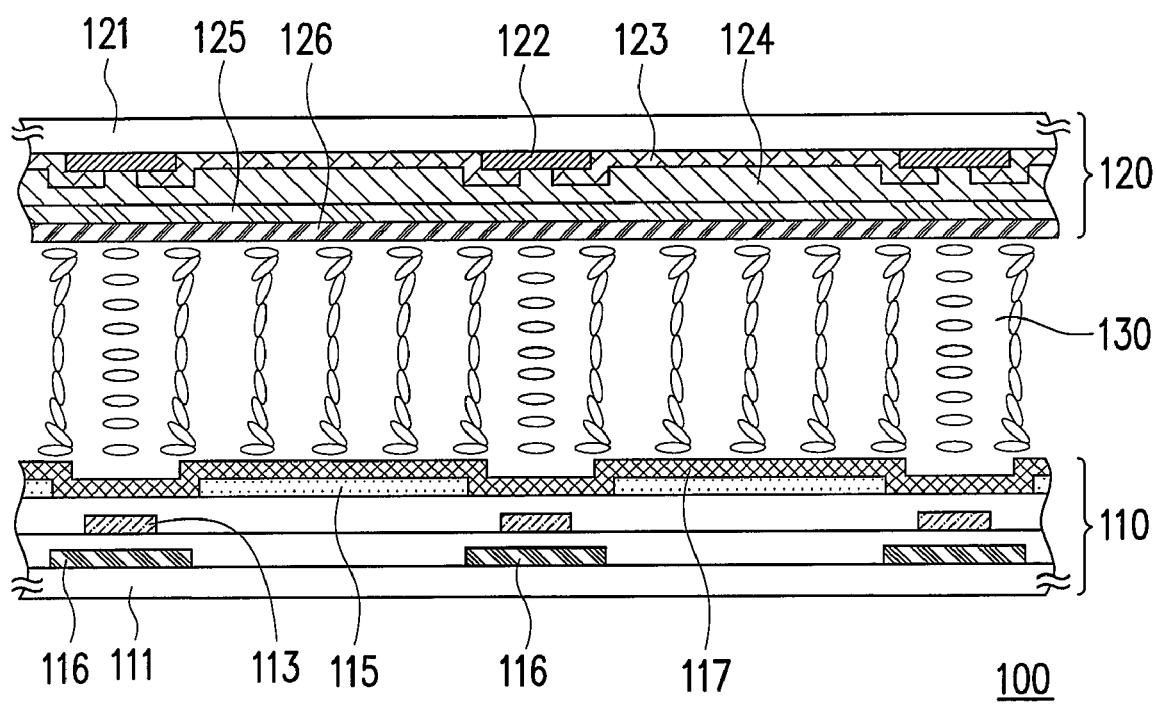
FIG. 1C is a cross-sectional view of an optically compensated birefringence LCD panel.
Figure 1D:
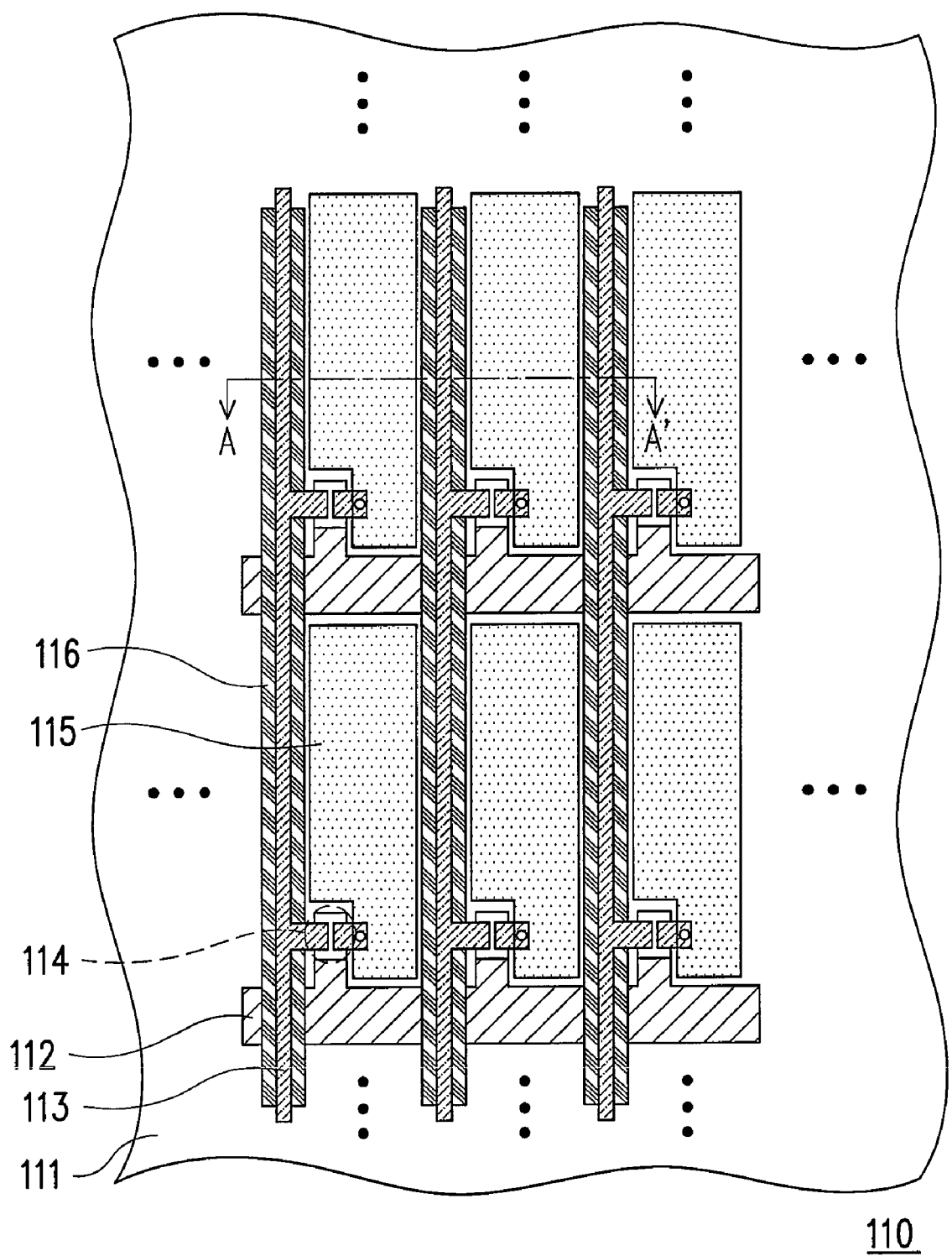
FIG. 1D is a top view of an active device array apparatus in the optically compensated birefringence LCD panel in FIG. 1C.
Figure 2A:
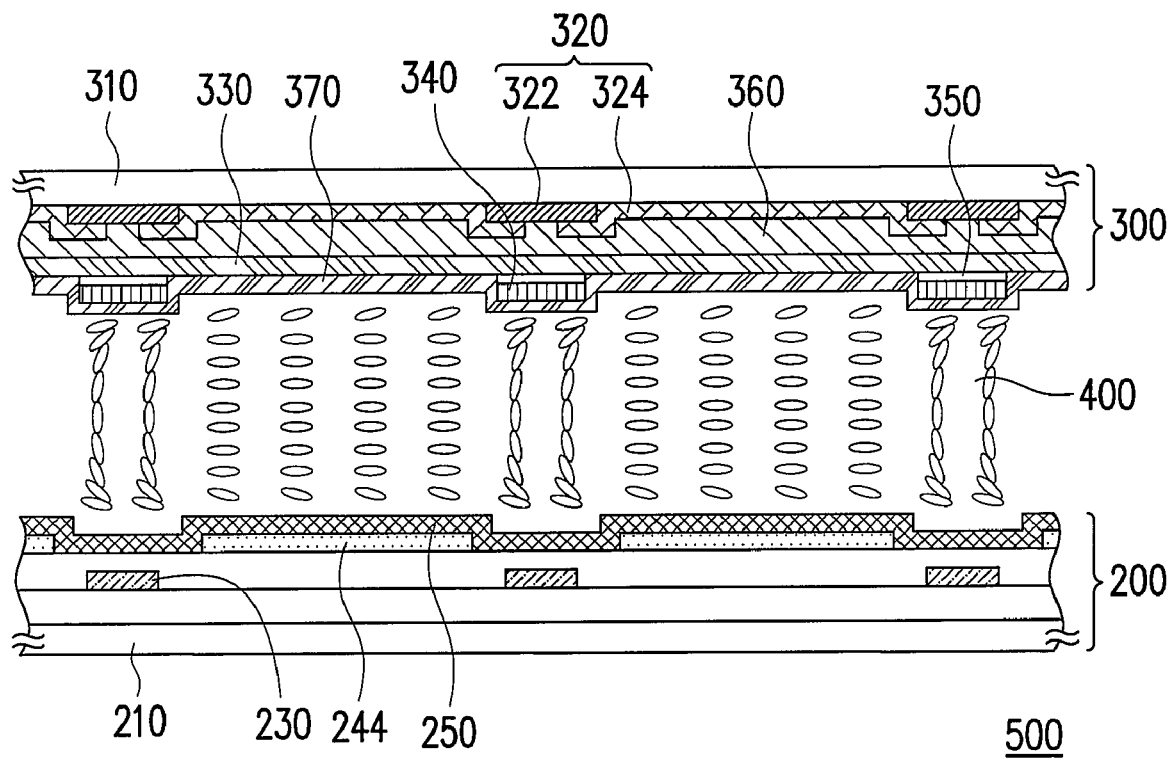
FIG. 2A is a cross-sectional view of an optically compensated birefringence LCD panel according to the first embodiment of the present invention.
Figure 2B:
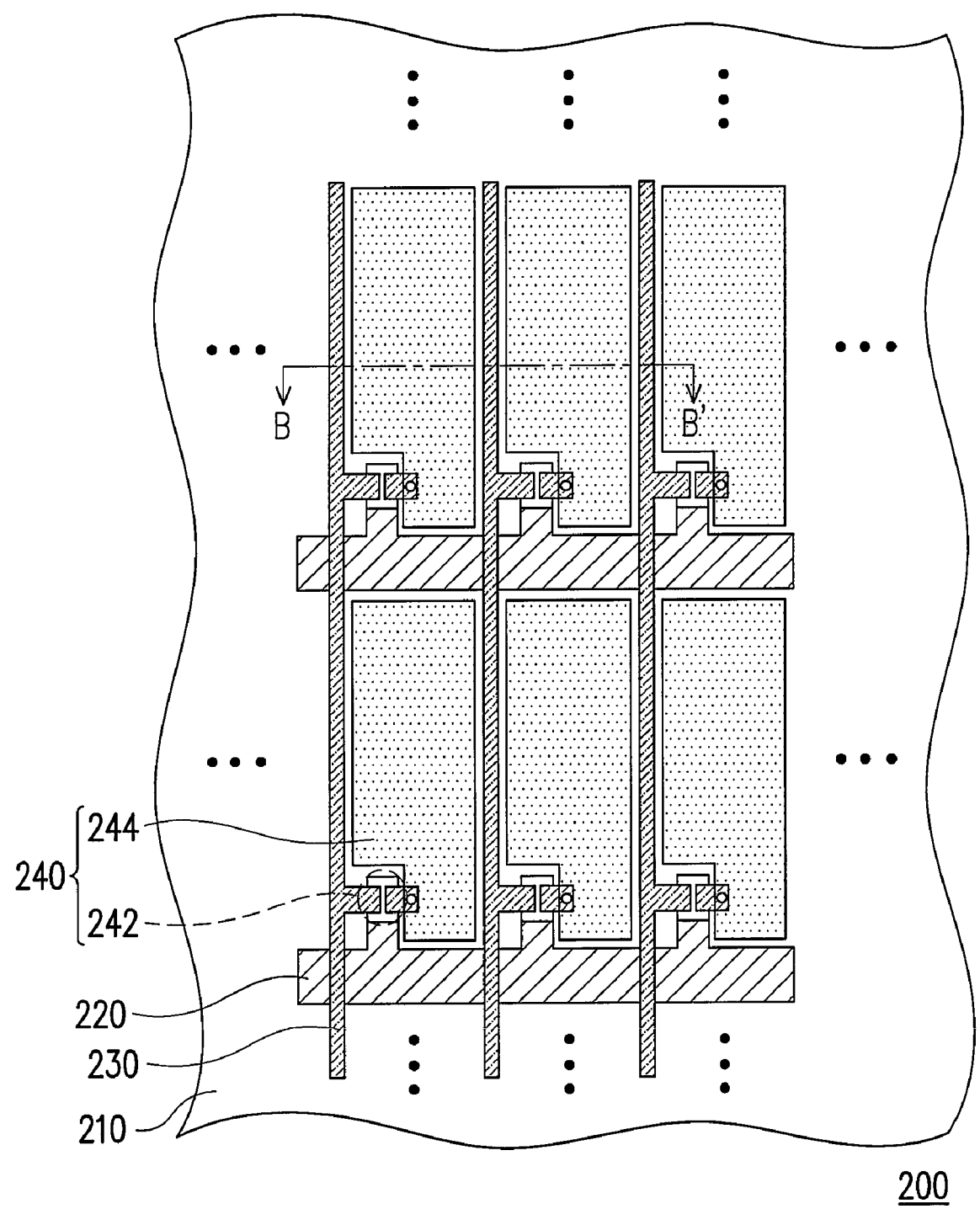
FIG. 2B is a top view of an active device array apparatus in an optically compensated birefringence LCD panel in FIG. 2A.

FIG. 2A is a cross-sectional view of an optically compensated birefringence LCD panel according to the first embodiment of the present invention, and FIG. 2B is a top view of an active device array apparatus in an optically compensated birefringence LCD panel in FIG. 2A, wherein the active device array apparatus in FIG. 2A is a cross-sectional view of FIG. 2B cut along line B-B'. Referring to both FIG. 2A and FIG. 2B, the optically compensated birefringence LCD panel 500 includes an active device array apparatus 200, a color filter apparatus 300, and an optically compensated birefringence liquid crystal layer 400 disposed between the active device array apparatus 200 and the color filter apparatus 300.

The active device array apparatus 200 includes a substrate 210, a plurality of scan lines 220, a plurality of data lines 230, and a plurality of pixel units 240. The scan lines 220, the data lines 230, and the pixel units 240 are all disposed on the substrate 210. Each pixel unit 240 is electrically connected to one of the scan lines 220 and one of the data lines 230, and each pixel unit 240 includes an active device 242 and a pixel electrode 244. The active device 242 is electrically connected to the corresponding scan line 220 and data line 230, and the pixel electrode 244 is electrically connected to the active device 242.

In particular, the substrate 210 is, for example, a glass substrate, quartz substrate, or substrate of other suitable material. The scan lines 220 are, for example, leads of aluminum alloy or leads formed by other suitable conductive material. The data lines 230 are, for example, chromium leads, leads of aluminum alloy, or leads formed by other suitable conductive material. The active device 242 is, for example, a thin film transistor or other triode-switching device. Though the active device 242 is illustrated as a thin film transistor in FIG. 2A, the active device 242 is not limited thereto. The pixel electrode 244 is, for example, a transmissive electrode, a reflective electrode, or transflective electrode, while the material of the pixel electrode 244 is ITO, IZO, metal, or other transmissive or non-transmissive conductive material.

The color filter apparatus 300 includes a substrate 310, a color filter array 320, a common electrode 330, a plurality of electrode lines 340, and an insulating layer 350. The color filter array 320 is disposed on the substrate 310, and the color filter array 320 has a black matrix 322 and a color filter layer 324. The common electrode 330 is disposed over the color filter array 320. The electrode lines 340 are disposed over the common electrode 330. The insulating layer 350 is disposed between the common electrode 330 and the electrode lines 340, so that the electrode lines 340 are electrically insulated from the common electrode 330. In addition, in the present embodiment, the scan lines 220 and the data lines 230 are disposed correspondingly to the black matrix 322 on the color filter apparatus 300. As described above, the substrate 310 is, for example, a glass substrate, quartz substrate, or substrate of other suitable material. The material of the black matrix 322 is, for example, chromium, chromium oxide, metal, black resin, or other suitable material. The material of the color filter layer 324 is, for example, resin. The material of the common electrode 330 is, for example, ITO, IZO, or other transmissive conductive material. The material of the electrode lines 340 is, for example, metal or other suitable material. The material of the insulating layer 350 is, for example, silicon nitride, silicon-oxy-nitride, or other suitable material.

In an embodiment, the optically compensated birefringence LCD panel 500 further includes a flat layer 360 disposed between the color filter array 320 and the common electrode 330, and the material of the flat layer 360 is, for example, organic insulating material or inorganic insulating material. In addition, the color filter apparatus 300 further includes an alignment layer 370 covering the common electrode 330 and the electrode lines 340, and the material of the alignment layer 370 is, for example, polyimide resin (PI) or other suitable material. In particular, in the present embodiment, the active device array apparatus 200 further includes an alignment layer 250 disposed over the scan lines 220 and the data lines 230. The alignment layer 250 covers the pixel electrodes 244. The material of the alignment layer 250 is, for example, the same as the material of the alignment layer 370, and the alignment layer 250 has an alignment direction the same as or parallel to that of the alignment layer 370.

As shown in FIG. 2A, the electrode lines 340 are disposed over the black matrix 322. In the optically compensated birefringence LCD panel 500, the design of the electrode lines 340 can pre-change the arrangement of the liquid crystal molecules in some region. In particular, the optically compensated birefringence LCD panel 500 further includes a first voltage signal source (not shown) and a second voltage signal source (not shown). The electrode lines 340 are electrically connected to the first voltage signal source, and the common electrode 330 is electrically connected to the second voltage signal source. The first voltage signal source provides a first voltage V1, the second voltage signal source provides a second voltage V2, and the first voltage V1 is greater than the second voltage V2.

Figure 2C:
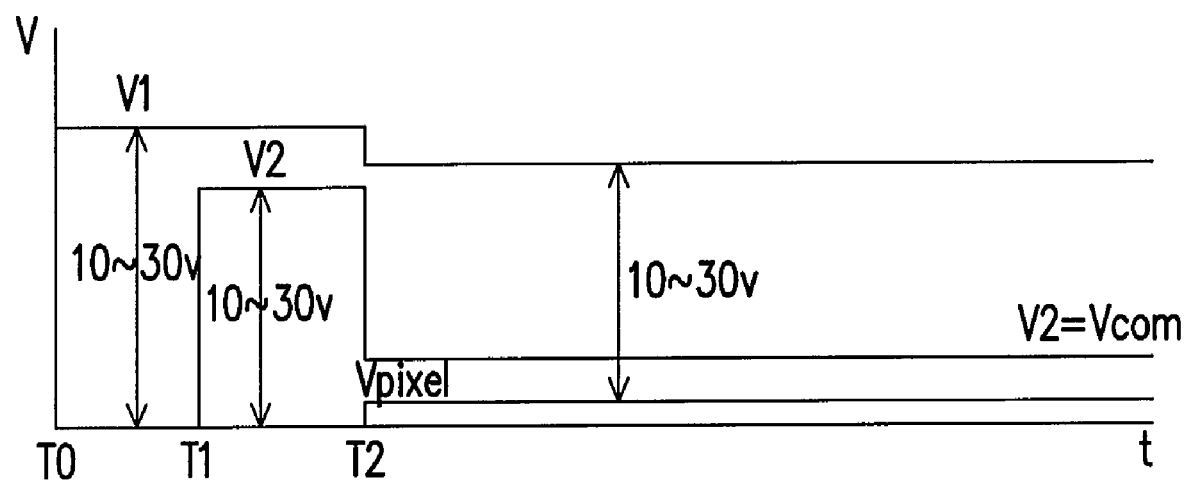
FIG. 2C is a voltage-time relationship diagram of the voltage signal in the optically compensated birefringence LCD panel in FIG. 2A.

FIG. 2C is a voltage-time relationship diagram of the voltage signal in the optically compensated birefringence LCD panel in FIG. 2A. Referring to FIG. 2C, before the optically compensated birefringence LCD panel 500 displays an image, i.e. during time T0 to time T1 in FIG. 2C, the electrode lines 340 are electrically connected to a first voltage V1, and the common electrode 330 is electrically connected to a second voltage V2. During this period, the first voltage V1 and the second voltage V2 are maintained, for example, between 10V and 30V, the voltage of the pixel electrodes 244 Vpixel is, for example, 0V, and the first voltage V1 is greater than the second voltage V2. In other words, a high voltage (i.e. the first voltage V1) is supplied to the electrode lines 340. In the optically compensated birefringence liquid crystal layer 400 under the electrode lines 340, the liquid crystal molecules over the scan lines 220 or the data lines 230 transit to bend state first under the affection of the first voltage V1. While the optically compensated birefringence LCD panel 500 displays an image, i.e. after time T2 in FIG. 2C, the voltage Vpixel of the pixel electrodes 244 is not 0, the first voltage V1 is maintained about 10V to 30V greater than Vpixel, and the second voltage V2 is reduced to Vcom which is slightly greater than Vpixel. Thus, the liquid crystal molecules over the scan lines 220 or the data lines 230 stay in bend state under the affection of the first voltage V1. While scan signals and data signals are respectively supplied to the scan lines 220 and the data lines 230 to drive the liquid crystal molecules over the pixel electrodes 244. Since the liquid crystal molecules over the scan lines 220 or the data lines 230 are already in bend state, thus, compared to the situation that all the liquid crystal molecules are in splay state, in the present embodiment, the rest liquid crystal molecules transit into bend state quickly under the affection of those liquid crystal molecules which have transited into bend state. In other words, the optically compensated birefringence LCD panel 500 will represent quick response performance at normal display driving.

It is remarkable that the electrode lines 340 are disposed in the color filter apparatus 300, and the scan lines 220 and the data lines 230 are disposed in the active device array apparatus 200. While the first voltage V1 is supplied to the electrode lines 340, the signal transmission in the scan lines 220 or the data lines 230 will not be affected. In the optically compensated birefringence LCD panel 500, the load effect to the data signal transmission in the data lines 230 is little, thus, the problem of signal delay will not be produced. In addition, the consumption power of the driver IC will not be increased.

Figure 2D:
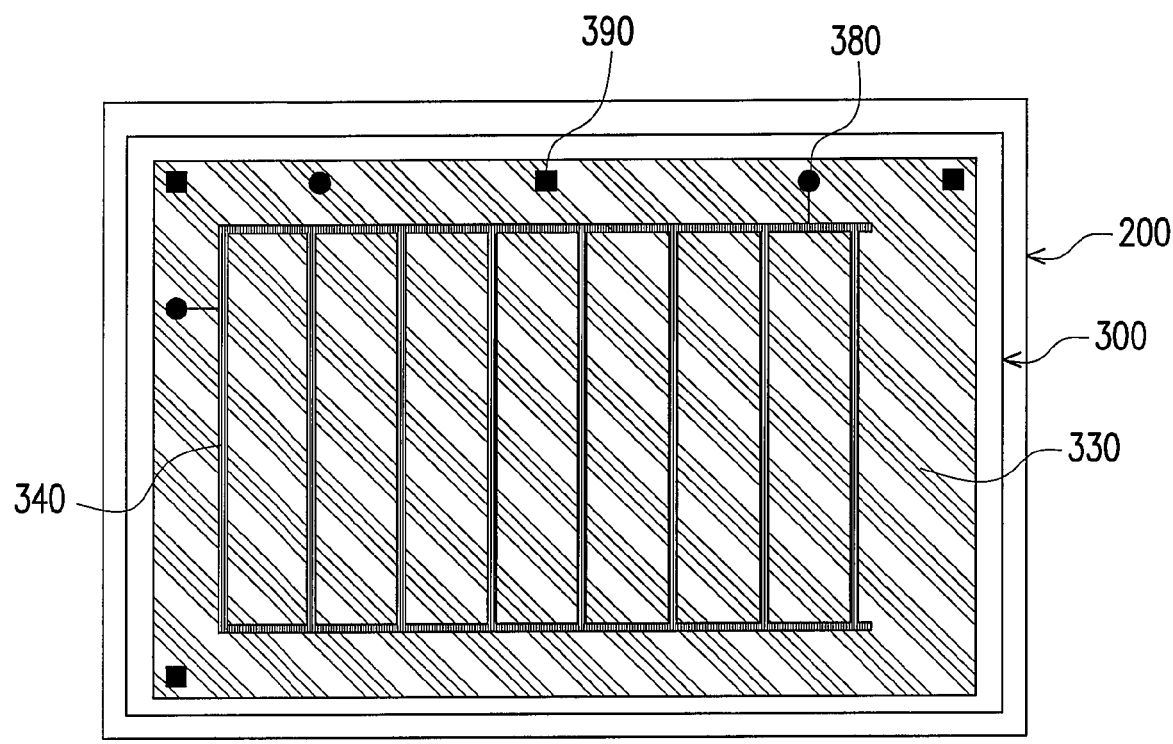
FIG. 2D is a top view of the optically compensated birefringence LCD panel in FIG. 2A.

FIG. 2D is a top view of the optically compensated birefringence LCD panel in FIG. 2A. Referring to FIG. 2D, in the optically compensated birefringence LCD panel 500, the electrode lines 340 are arranged, for example, in parallel, and a pixel is disposed between two electrode lines 340. As shown in FIG. 2D, the electrode lines 340 are electrically connected to each other and to a plurality of first nodes 380. The first nodes 380 are electrically connected to the first pad (not shown) of the active device array apparatus 200 through a silver paste (not shown). The first pad is electrically connected to the first voltage signal source of the driver IC (not shown) through a wiring (not shown). In addition, the common electrode 330 is electrically connected to a plurality of second nodes 390. The second nodes 390 are electrically connected to the second voltage signal source of the driver IC (not shown) through silver pastes, the second pad (not shown) of the active device array apparatus 200, and other wirings of the active device array apparatus 200.

Figure 2E:
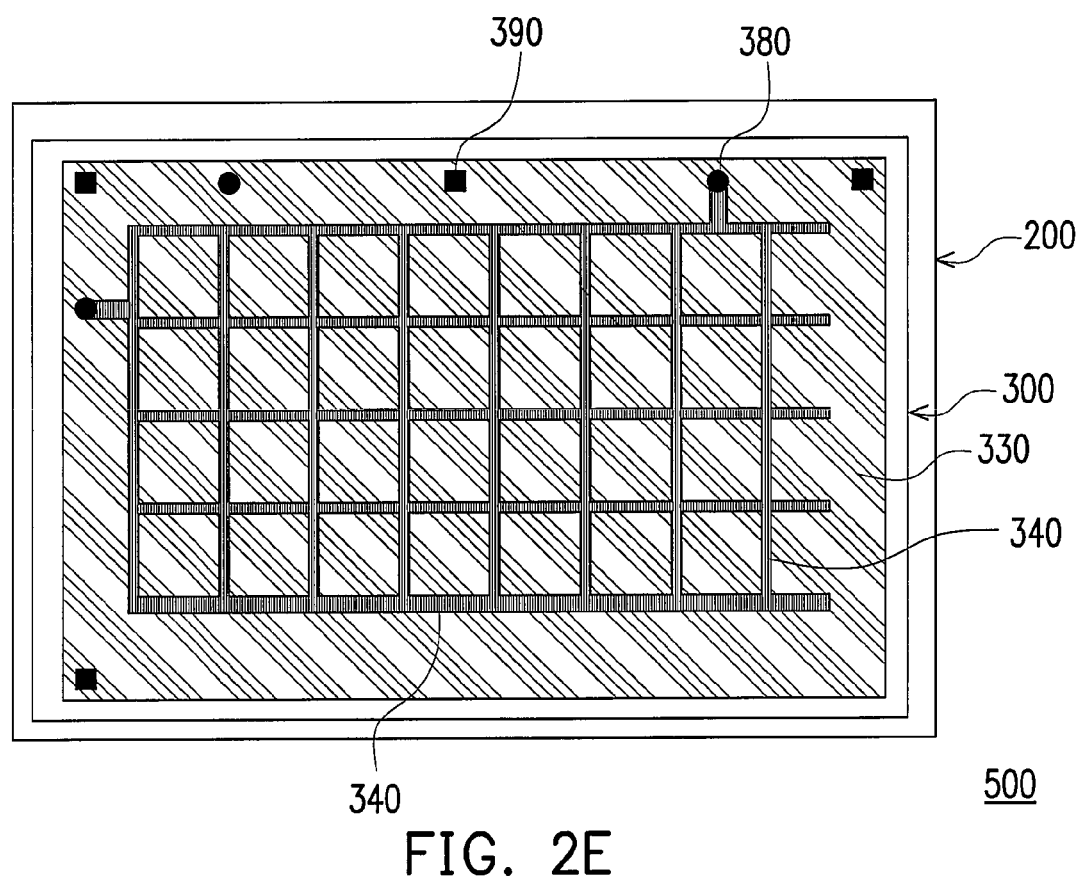
FIG. 2E is a top view of the optically compensated birefringence LCD panel in FIG. 2A.

Note that the arrangement of the electrode lines 340 is not limited to the manner as shown in FIG. 2D, which may also be the check arrangement as shown in FIG. 2E. It is not limited to disposing only one pixel between any two electrode lines 340; a plurality of pixels can be disposed between any two electrode lines 340 in other embodiments. Furthermore, if only one pixel is disposed within each check enclosed by the electrode lines 340, the arrangement of the electrode lines 340 is the same as that of the black matrix 322.

Second Embodiment

Figure 3A:
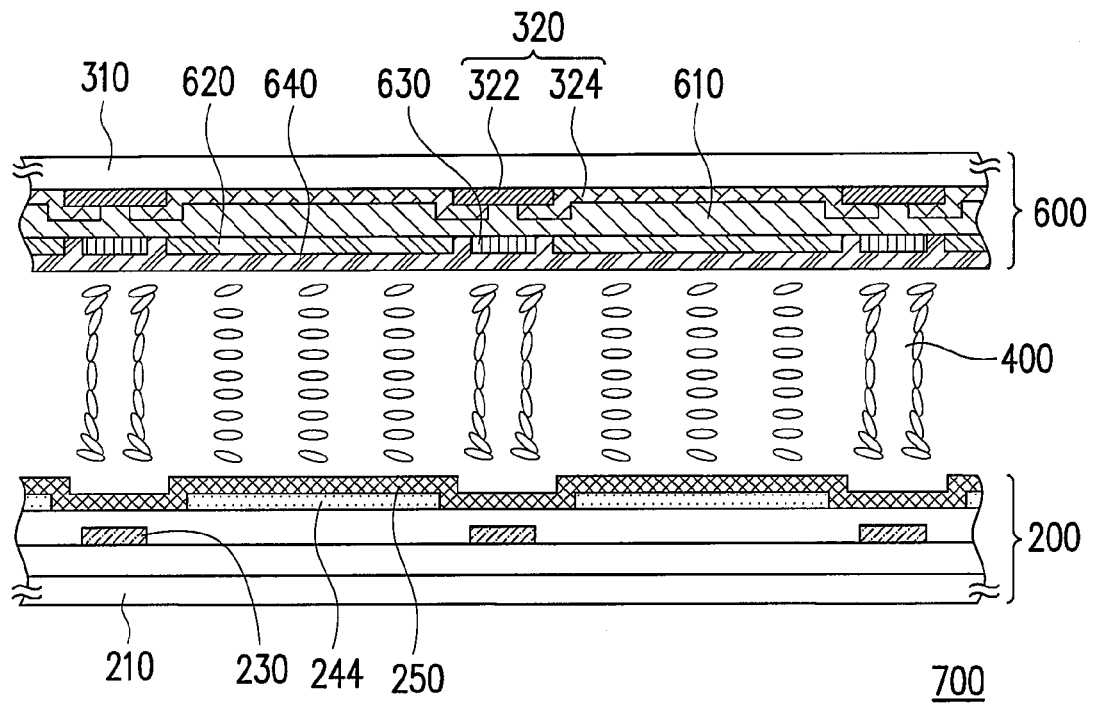
FIG. 3A is a cross-sectional view of an optically compensated birefringence LCD panel according to the second embodiment of the present invention.

FIG. 3A is a cross-sectional view of an optically compensated birefringence LCD panel according to the second embodiment of the present invention, wherein the active device array apparatus of the optically compensated birefringence LCD panel in FIG. 3A is the same as the active device array apparatus in FIG. 2B. Referring to FIG. 3A, the optically compensated birefringence LCD panel 700 includes an active device array apparatus 200, a color filter apparatus 600, and an optically compensated birefringence liquid crystal layer 400 disposed between the active device array apparatus 200 and the color filter apparatus 600.

The active device array apparatus 200 and the optically compensated birefringence liquid crystal layer 400 are the same as those described in the first embodiment, so the details will not be described here again. The color filter apparatus 600 includes a substrate 310, a color filter array 320, a flat layer 610, a plurality of electrode patterns 620, and a plurality of electrode lines 630. The substrate 310 and the color filter array 320 are the same as those described in the first embodiment. The flat layer 610 covers the color filter array 320. The electrode patterns 620 are disposed on the flat layer 610. The electrode lines 630 are disposed on the flat layer 610, and the electrode lines 630 are electrically insulated from the electrode patterns 620. In addition, the optically compensated birefringence LCD panel 700 further includes a first voltage signal source (not shown) and a second voltage signal source (not shown). The electrode lines 630 are electrically connected to the first voltage signal source, the electrode patterns 620 are electrically connected to the second voltage signal source, wherein the first voltage signal source provides a first voltage V1, the second voltage signal source provides a common voltage Vc, and the first voltage V1 is greater than the common voltage Vc.

As described above, the materials of the flat layer 610 and the electrode patterns 620 are, for example, respectively the same as the materials of the flat layer 360 and the common electrode 330 in the first embodiment. The material of the electrode lines 630 is, for example, the same as that of the electrode patterns 620.

As shown in FIG. 3A, the optically compensated birefringence LCD panel 700 in the present embodiment further includes an alignment layer 640 covering the electrode patterns 620 and the electrode lines 630, and the material of the alignment layer 640 is, for example, the same as that of the alignment layer 250 in the first embodiment. As shown in FIG. 3A, there is a space between the electrode patterns 620 and the electrode lines 630 disposed on the flat layer 360, so that the electrode lines 630 are electrically insulated from the electrode patterns 620. The electrode patterns 620 are correspondingly disposed over the color filter layer 324, and the electrode lines 630 are correspondingly disposed over the black matrix 322. It is remarkable that the electrode lines 630 are electrically connected to a first voltage V1, which is greater than the common voltage Vc. Similar to the first embodiment, before the optically compensated birefringence LCD panel 700 displays an image, in the liquid crystal layer 400 under the electrode lines 630, the liquid crystal molecules over the scan lines 220 and the data lines 230 transit to bend state under the affection of the first voltage V1. While the optically compensated birefringence LCD panel 700 displays an image, the rest liquid crystal molecules transit to bend state quickly under the affection of those already transited into bend state. Thus, the optically compensated birefringence LCD panel 700 will represent quick response performance at normal display driving.

In addition, the electrode lines 630 supplied with the first voltage V1 are disposed in the color filter apparatus 600, since the load effect to the data signal transmission in the data lines 230 is little, the signal transmissions in the scan lines 220 or the data lines 230 will not be affected, the problem of signal delay will not be produced in the optically compensated birefringence LCD panel 700, and the consumption power of the driver IC will not be increased.

Figure 3B:
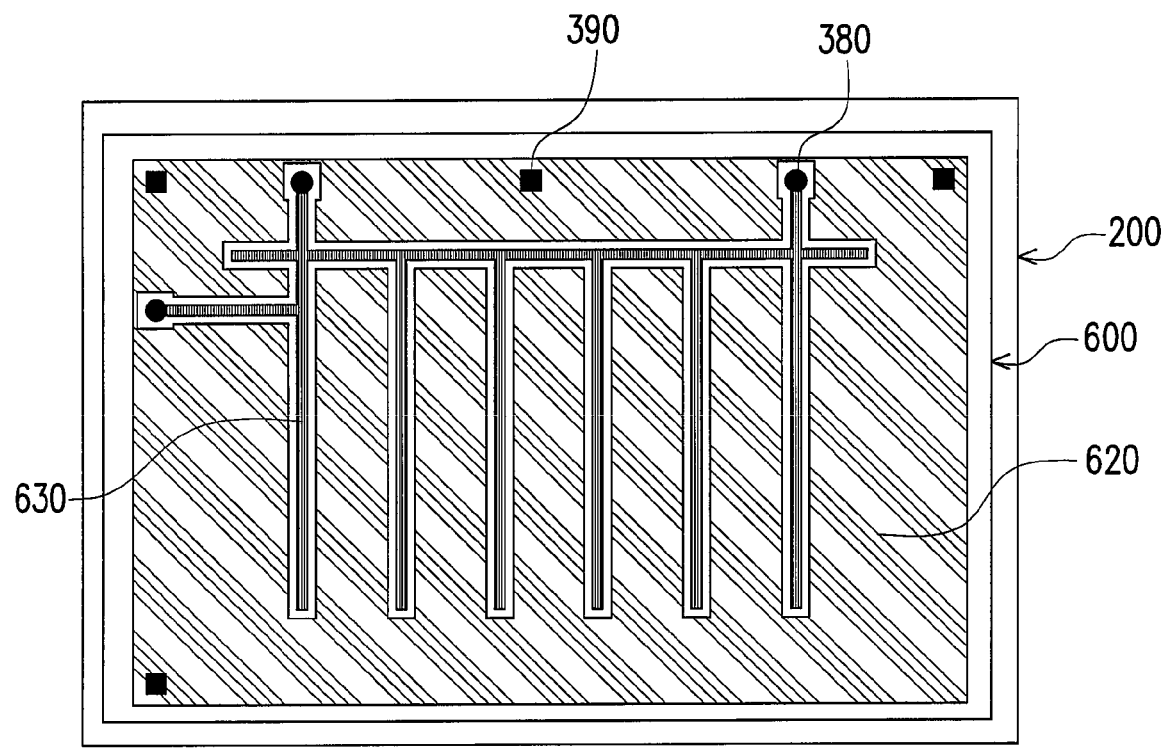
FIG. 3B is a top view of the optically compensated birefringence LCD panel in FIG. 3A.

FIG. 3B is a top view of the optically compensated birefringence LCD panel in FIG. 3A. Referring to FIG. 3B, similar to the first embodiment, in the optically compensated birefringence LCD panel 700, the electrode lines 630 electrically connected with each other are all connected to the first nodes 380. The first nodes 380 are electrically connected to the first signal voltage source of the driver IC (not shown) through silver pastes (not shown), the first pad (not shown) of the active device array apparatus 300, and wirings (not shown). The electrode patterns 620 are electrically connected to a plurality of second nodes 390, and the second nodes 390 are electrically connected to the second voltage signal source of the driver IC (not shown) through silver pastes (not shown), the second pad (not shown) of the active device array apparatus 200, and the other wirings of the active device array apparatus 200.

Third Embodiment

Figure 4:
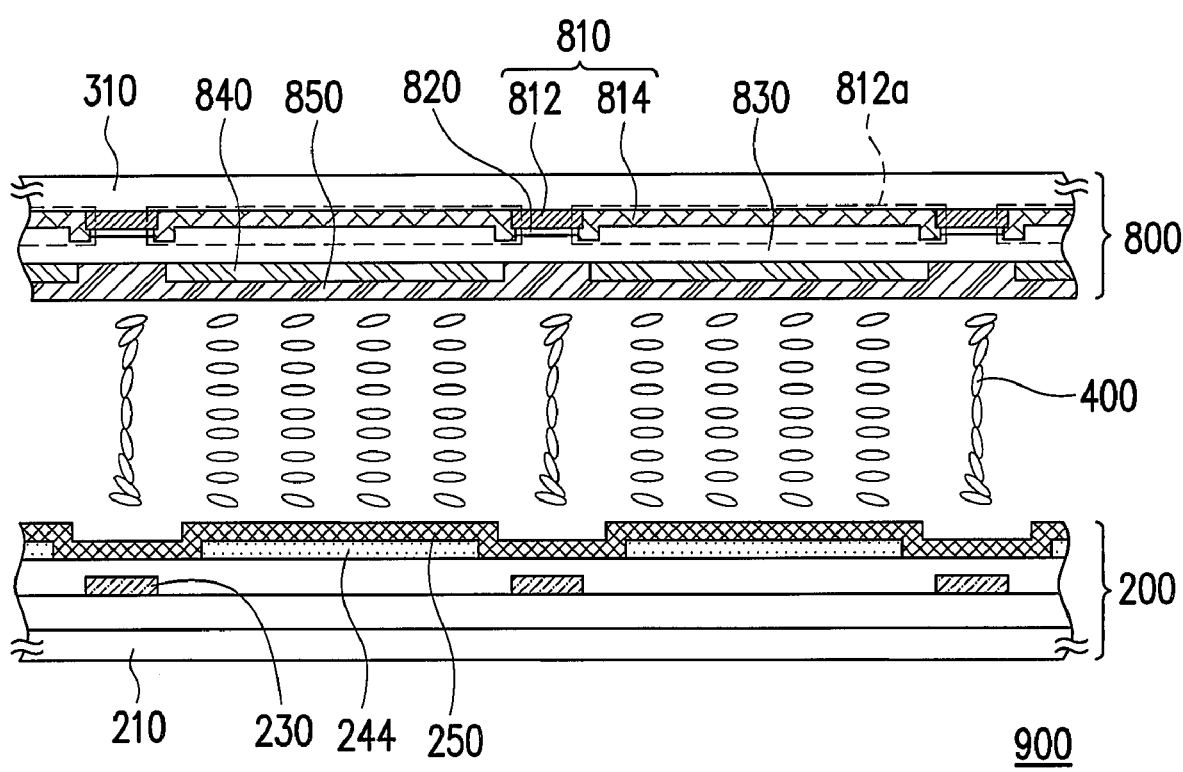
FIG. 4 is a cross-sectional view of an optically compensated birefringence LCD panel according to the third embodiment of the present invention.

FIG. 4 is a cross-sectional view of an optically compensated birefringence LCD panel according to the third embodiment of the present invention, wherein the active device array apparatus of the optically compensated birefringence LCD panel in FIG. 4 is the same as the active device array apparatus in FIG. 2B. Referring to FIG. 4, the optically compensated birefringence LCD panel 900 includes an active device array apparatus 200, a color filter apparatus 800, and an optically compensated birefringence liquid crystal layer 400 disposed between the active device array apparatus 200 and the color filter apparatus 800.

The active device array apparatus 200 and the optically compensated birefringence liquid crystal layer 400 are the same as those described in the first embodiment, so details will not be described again. The color filter apparatus 800 includes a substrate 310, a color filter array 810, an insulating layer 820, a flat layer 830, and a plurality of electrode patterns 840. The substrate 310 is the same as that described in the first embodiment. The color filter array 810 is disposed on the substrate 310, and the color filter array 810 includes a black matrix 812 and a color filter layer 814. The black matrix 812 defines a plurality of pixel regions 812a on the substrate 310, and the color filter layer 814 is disposed within the pixel regions 812a. The insulating layer 820 covers the surface of the black matrix 812. The flat layer 830 is disposed on the color filter array 810 and the insulating layer 820. The electrode patterns 840 are disposed on the flat layer 830 within the pixel regions 812a. In addition, the optically compensated birefringence LCD panel 900 further includes a first voltage signal source (not shown) and a second voltage signal source (not shown). The black matrix 812 is electrically connected to the first voltage signal source, and the electrode patterns 840 are electrically connected to the second voltage signal source. The first voltage signal source provides a first voltage V1, the second voltage signal source provides a common voltage Vc, and the first voltage V1 is greater than the common voltage Vc.

As described above, the materials of the color filter layer 814, the insulating layer 820, the flat layer 830, and the electrode patterns 840 are respectively the same as the materials of the color filter layer 324, the insulating layer 350, the flat layer 360, and the common electrode 330 in the first embodiment. The material of the black matrix 812 is, for example, conductive material or other suitable material.

As described in FIG. 4, the optically compensated birefringence LCD panel 900 in the present embodiment further includes an alignment layer 850 covering the flat layer 830 and the electrode patterns 840, and the material of the alignment layer 850 is, for example, the same as the material of the alignment layer 250 in the first embodiment. In addition, the electrode patterns 840 is disposed over the color filter layer 814 without covering the black matrix 812. The black matrix 812 is electrically connected to a first voltage V1, and the first voltage V1 is greater than the common voltage Vc. Before the optically compensated birefringence LCD panel 900 displays an image, in the optically compensated birefringence liquid crystal layer 400 under the black matrix 812, the liquid crystal molecules over the scan lines 220 or the data lines 230 will transit to bend state under the affection of the first voltage V1. While the optically compensated birefringence LCD panel 900 is displaying the image, the other liquid crystal molecules will transit to bend state quickly under the affection of those liquid crystal molecules which have transited into bend state, so that the optically compensated birefringence LCD panel 900 represents quick response performance.

In addition, since the load effect to data signal transmission in the data lines 230 is little, so when the first voltage V1 is supplied to the black matrix 812, the signal transmission in the scan lines 220 or the data lines 230 is not affected. The problem of signal delay in the optically compensated birefringence LCD panel 900 will not be produced, and the consumption power of the driver IC will not be increased.

Please note that in the optically compensated birefringence LCD panel 900 of the present embodiment, the material of the black matrix 812 is conductive material, and function thereof is the same as those of the electrode lines 340 in the first embodiment or the electrode lines 630 in the second embodiment. The arrangement of the black matrix 812 is, for example, the same as the check arrangement of the electrode lines 340 in FIG. 2E.

In overview, the optically compensated birefringence LCD panel in the present invention has at least the following advantages:

1. In the optically compensated birefringence LCD panel of the present invention, the speed of the liquid crystal molecules of the optically compensated birefringence LCD panel transiting from splay state to bend state can be increased through the electric field formed by the scan lines or the data lines and the electrode lines.

2. In the optically compensated birefringence LCD panel of the present invention, the electrode lines or the black matrix are far from the scan lines and the data lines; while a high voltage is supplied to the electrode lines or the black matrix, since the load effect to the data signal transmission in the data lines is little, the signal transmission in the scan lines or the data lines will not be affected. Thus, the optically compensated birefringence LCD panel will not have the problem of signal delay.

3. In the optically compensated birefringence LCD panel of the present invention, the electrode lines or the black matrix are far from the scan lines and the data lines; while a high voltage is supplied to the electrode lines or the black matrix, since the load effect to the data signal transmission in the data lines 230 is relatively little, the signal transmission in the scan lines or the data lines will not be affected. Accordingly, the consumption power of the driver IC will not be increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optically compensated birefringence LCD panel, comprising:
an active device array apparatus, a color filter apparatus, and an optically compensated birefringence liquid crystal layer disposed between the active device array apparatus and the color filter apparatus,
wherein the active device array apparatus comprises:
a substrate;
a plurality of scan lines, disposed on the substrate;
a plurality of data lines, disposed on the substrate; and
a plurality of pixel units, disposed on the substrate, each of the pixel units being electrically connected to one of the scan lines and one of the data lines;
wherein the color filter apparatus comprises:
a substrate;
a color filter array, disposed on the substrate, the color filter array having a black matrix and a color filter layer;
a common electrode, disposed over the color filter array;
a plurality of electrode lines, disposed over the common electrode and corresponding to at least one of the scan lines and the data lines; and
an insulating layer, disposed between the common electrode and the electrode lines, so that the electrode lines are electrically insulated from the common electrode.

2. The optically compensated birefringence LCD panel as claimed in claim 1, wherein the scan lines and the data lines are disposed correspondingly to the black matrix on the color filter apparatus.

3. The optically compensated birefringence LCD panel as claimed in claim 1, wherein each pixel unit is electrically connected to one of the scan lines and one of the data lines, and each pixel unit comprises an active device and a pixel electrode.

4. The optically compensated birefringence LCD panel as claimed in claim 3, wherein the active device is electrically connected to the corresponding scan line and data line, and the pixel electrode is electrically connected to the active device.

5. The optically compensated birefringence LCD panel as claimed in claim 1 further comprises a flat layer disposed between the color filter array and the common electrode.

6. The optically compensated birefringence LCD panel as claimed in claim 1, wherein the electrode lines are disposed over the black matrix.

7. The optically compensated birefringence LCD panel as claimed in claim 1, wherein the material of the electrode lines includes metal.

8. The optically compensated birefringence LCD panel as claimed in claim 1, wherein the color filter apparatus further comprises an alignment layer covering the common electrode and the electrode lines.

9. The optically compensated birefringence LCD panel as claimed in claim 1 further comprises a first voltage signal source and a second voltage signal source, wherein the electrode lines are electrically connected to the first voltage signal source, the common electrode is electrically connected to the second voltage signal source, the first voltage signal source provides a first voltage, the second voltage signal source provides a second voltage, and the first voltage is greater than the second voltage.

10. The optically compensated birefringence LCD panel as claimed in claim 1, wherein the material of the black matrix includes one of metal and resin.

11. An optically compensated birefringence LCD panel, comprising:
an active device array apparatus, a color filter apparatus, and an optically compensated birefringence liquid crystal layer disposed between the active device array apparatus and the color filter apparatus, wherein the active device array apparatus comprises:
a substrate;
a plurality of scan lines, disposed on the substrate;
a plurality of data lines, disposed on the substrate; and
a plurality of pixel units, disposed on the substrate, each pixel unit being electrically connected to one of the scan lines and one of the data lines;
wherein the color filter apparatus comprises:
a substrate;
a color filter array, disposed on the substrate, the color filter array having a black matrix and a color filter layer;
a flat layer, covering the color filter array;
a plurality of electrode patterns, disposed on the flat layer; and
a plurality of electrode lines, disposed on the flat layer and corresponding to at least one of the scan lines and data lines, the electrode lines being electrically insulated from the electrode patterns.

12. The optically compensated birefringence LCD panel as claimed in claim 11, wherein the scan lines and the data lines are disposed correspondingly to the black matrix on the color filter apparatus.

13. The optically compensated birefringence LCD panel as claimed in claim 11, wherein each pixel unit is electrically connected to one of the scan lines and one of the data lines, and each pixel unit comprises an active device and a pixel electrode.

14. The optically compensated birefringence LCD panel as claimed in claim 13, wherein the active device is electrically connected to the corresponding scan line and data line, and the pixel electrode is electrically connected to the active device.

15. The optically compensated birefringence LCD panel as claimed in claim 11, wherein the material of the electrode patterns is the same as the material of the electrode lines.

16. The optically compensated birefringence LCD panel as claimed in claim 11, wherein a space exists between the electrode patterns and the electrode lines disposed on the flat layer, so that the electrode lines are electrically insulated from the electrode patterns.

17. The optically compensated birefringence LCD panel as claimed in claim 11, wherein the electrode patterns are correspondingly disposed over the color filter layer, and the electrode lines are correspondingly disposed over the black matrix.

18. The optically compensated birefringence LCD panel as claimed in claim 11, wherein the color filter apparatus further comprises an alignment layer covering the electrode patterns and the electrode lines.

19. The optically compensated birefringence LCD panel as claimed in claim 11 further comprises a first voltage signal source and a second voltage signal source, wherein the electrode lines are electrically connected to the first voltage signal source, the electrode patterns are electrically connected to the second voltage signal source, the first voltage signal source provides a first voltage, the second voltage signal source provides a common voltage, and the first voltage is greater than the common voltage.

20. The optically compensated birefringence LCD panel as claimed in claim 11, wherein the material of the black matrix includes one of metal and resin.

21. An optically compensated birefringence LCD panel, comprising:
an active device array apparatus, a color filter apparatus, and an optically compensated birefringence liquid crystal layer disposed between the active device array apparatus and the color filter apparatus,
wherein the active device array apparatus comprises:
a substrate;
a plurality of scan lines, disposed on the substrate;
a plurality of data lines, disposed on the substrate; and
a plurality of pixel units, disposed on the substrate, each pixel unit being electrically connected to one of the scan lines and one of the data lines;
wherein the color filter apparatus comprises:
a substrate;
a color filter array, disposed on the substrate, the color filter array comprising a black matrix and a color filter layer, wherein the black matrix is formed of conductive material and defines a plurality of pixel regions on the substrate, and the color filter layer is disposed within the pixel regions;
an insulating layer, covering the surface of the black matrix;
a flat layer, disposed on the color filter array and the insulating layer; and
a plurality of electrode patterns, disposed on the flat layer within the pixel regions.

22. The optically compensated birefringence LCD panel as claimed in claim 21, wherein the scan lines and the data lines are disposed correspondingly to the black matrix on the color filter apparatus.

23. The optically compensated birefringence LCD panel as claimed in claim 21, wherein each pixel unit is electrically connected to one of the scan lines and one of the data lines, and each pixel unit comprises an active device and a pixel electrode.

24. The optically compensated birefringence LCD panel as claimed in claim 23, wherein the active device is electrically connected to the corresponding scan line and data line, and the pixel electrode is electrically connected to the active device.

25. The optically compensated birefringence LCD panel as claimed in claim 21 further comprises a first voltage signal source and a second voltage signal source, wherein the black matrix is electrically connected to the first voltage signal source, the electrode patterns are electrically connected to the second voltage signal source, the first voltage signal source provides a first voltage, the second voltage signal source provides a common voltage, and the first voltage is greater than the common voltage.

26. The optically compensated birefringence LCD panel as claimed in claim 21, wherein the electrode patterns are disposed over the color filter layer without covering the black matrix.

27. The optically compensated birefringence LCD panel as claimed in claim 21, wherein the color filter apparatus further comprises an alignment layer covering the flat layer and the electrode patterns.

* * * * *